(12) United States Patent
Schmid et al.

(10) Patent No.: US 7,786,222 B2
(45) Date of Patent: Aug. 31, 2010

(54) POLYAMIDE OLIGOMERS AND THEIR USE

(75) Inventors: Eduard Schmid, Bonaduz (CH); Botho Hoffmann, Domat/Ems (CH)

(73) Assignee: EMS-Chemie AG, Domat/Ems (CH)

( * ) Notice: Subject to any disclaimer, the term of this patent is extended or adjusted under 35 U.S.C. 154(b) by 92 days.

(21) Appl. No.: 11/914,916

(22) PCT Filed: Apr. 24, 2006

(86) PCT No.: PCT/EP2006/003753

§ 371 (c)(1),
(2), (4) Date: Mar. 7, 2008

(87) PCT Pub. No.: WO2006/122633

PCT Pub. Date: Nov. 23, 2006

(65) Prior Publication Data

US 2009/0131674 A1 May 21, 2009

(30) Foreign Application Priority Data

May 20, 2005 (DE) .................. 10 2005 023 419

(51) Int. Cl.
C08L 77/00 (2006.01)
C08L 51/00 (2006.01)
C08G 69/14 (2006.01)
C08G 69/26 (2006.01)
C08K 5/34 (2006.01)
C08J 3/20 (2006.01)
C08J 3/22 (2006.01)
C07D 211/56 (2006.01)
C07D 211/98 (2006.01)

(52) U.S. Cl. .............. 525/432; 528/323; 528/332; 528/335; 528/347; 524/538; 524/98; 523/351; 546/244

(58) Field of Classification Search .......... 528/310, 528/315, 323; 523/351; 546/244
See application file for complete search history.

(56) References Cited

U.S. PATENT DOCUMENTS

| | | | | |
|---|---|---|---|---|
| 3,687,904 A | * | 8/1972 | Middleton | 528/323 |
| 3,711,447 A | * | 1/1973 | Jakob et al. | 528/315 |
| 5,112,908 A | * | 5/1992 | Epstein | 525/66 |
| 5,154,881 A | | 10/1992 | Rutz et al. | |
| 5,274,033 A | * | 12/1993 | Epstein | 525/66 |
| 5,288,799 A | * | 2/1994 | Schmid et al. | 525/66 |
| 5,618,909 A | * | 4/1997 | Lofquist et al. | 528/310 |
| 5,643,502 A | | 7/1997 | Nahass et al. | |
| 5,744,433 A | | 4/1998 | Storström et al. | |
| 5,763,561 A | * | 6/1998 | Keske | 528/310 |
| 6,150,496 A | * | 11/2000 | Ilg et al. | 528/332 |
| 6,267,148 B1 | | 7/2001 | Katayama et al. | |
| 6,528,572 B1 | | 3/2003 | Patel et al. | |
| 6,548,591 B2 | * | 4/2003 | Koning et al. | 524/494 |
| 6,942,823 B2 | | 9/2005 | Terada et al. | |
| 2003/0029272 A1 | | 2/2003 | Vidarsson et al. | |
| 2004/0082729 A1 | | 4/2004 | Terada et al. | |
| 2005/0084686 A1 | * | 4/2005 | Imaizumi | 428/425.5 |
| 2006/0052528 A1 | | 3/2006 | Ottenheijm | |
| 2009/0131569 A1 | * | 5/2009 | Schwitter et al. | 524/423 |
| 2010/0028646 A1 | | 2/2010 | Schwitter et al. | |

FOREIGN PATENT DOCUMENTS

| | | |
|---|---|---|
| DE | 3901716 A1 | 7/1990 |
| DE | 3901717 A1 | 7/1990 |
| DE | 3930089 A1 | 3/1991 |
| DE | 3932912 A1 | 4/1991 |
| DE | 4131926 A1 | 4/1992 |
| DE | 19537614 A1 | 4/1997 |
| DE | 19745099 A1 | 4/1999 |
| DE | 10247470 A1 | 4/2004 |
| DE | 10255044 A1 | 6/2004 |
| EP | 0272695 A2 | 6/1988 |
| EP | 0272695 A3 | 6/1988 |
| EP | 0261020 B1 | 12/1990 |
| EP | 0555578 A2 | 8/1993 |
| EP | 0555578 A3 | 8/1993 |
| EP | 0345645 A1 | 8/1995 |
| EP | 0345645 B1 | 8/1995 |
| EP | 0272695 B2 | 7/1997 |
| EP | 0957131 A2 | 11/1999 |
| EP | 0957131 A3 | 11/1999 |
| EP | 1125985 A1 | 8/2001 |

(Continued)

OTHER PUBLICATIONS

English Language Abstract of JP 2005-146269 A, Sep. 6, 2005.

(Continued)

*Primary Examiner*—Vasu Jagannathan
*Assistant Examiner*—Anthony H Sheh
(74) *Attorney, Agent, or Firm*—Greenblum & Bernstein, P.L.C.

(57) ABSTRACT

The present invention relates to polyamide oligomers with linear or branched chain structure with a number average molar mass of 800 to 5000 g/mol, with basic end groups which are at least partially $NH_2$ end groups and carboxyl end groups, produced by condensation of polyamide-forming monomers, the concentration of $NH_2$ end groups being at most 300 mmol/kg and in that these end groups are present in excess in a ratio to the carboxyl end groups.

23 Claims, 1 Drawing Sheet

FOREIGN PATENT DOCUMENTS

| | | |
|---|---|---|
| EP | 0953796 B | 7/2003 |
| EP | 0957131 B1 | 7/2003 |
| EP | 1217039 B1 | 7/2004 |
| EP | 1454963 A1 | 9/2004 |
| JP | 2005-146269 A | 9/2005 |
| WO | 90/08807 A1 | 8/1990 |
| WO | 02/083345 A1 | 10/2002 |
| WO | 02/083346 A1 | 10/2002 |
| WO | 2004/055109 A2 | 7/2004 |
| WO | 2004/055109 A3 | 7/2004 |
| WO | 2005/000953 A2 | 1/2005 |
| WO | 2005/000953 A3 | 1/2005 |
| WO | 2005/032817 A1 | 4/2005 |
| WO | 2006/122602 A1 | 3/2006 |

OTHER PUBLICATIONS

R.G. Gilg, "Carbon Black for Conductive Plastic Materials" in: Electrically conductive Plastic Materials, publishers: H.J. Mair, S. Roth, $2^{nd}$ Edition, Carl Hanser Verlag, 1989, Munich Vienna, pp. 21-36 (Russ Fuer Leitfahige Kunststoffe, p. 21-36).

Plastics 2000, 9, pp. 116-118 (Technische Kunststoffe 2000, p. 116-118).

Holleman-Widberg, "Textbook of Inorganic Chemistry" $91^{st}$-$100^{th}$ edition, pp. 701-702, 1985 (Lehrbuch der anorganishen Chemie, p. 701-702, 1985).

U.S. Appl. No. 11/914,920 to Paul Schwitter et al., I.A. filed Mar. 24, 2006, entitled "Polymide Oligomers and Their Use".

* cited by examiner

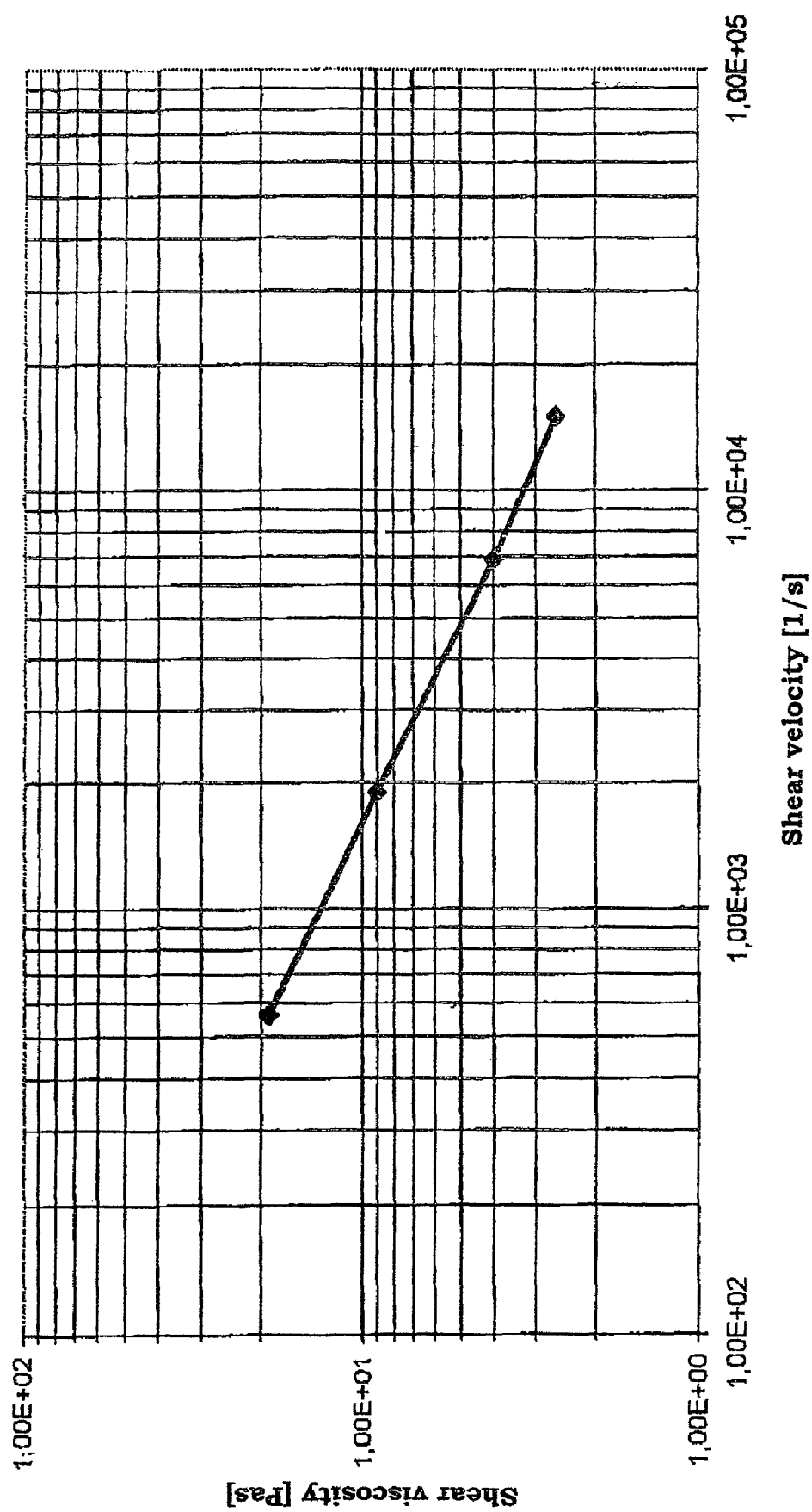

POLYAMIDE OLIGOMERS AND THEIR USE

The present invention relates to a special class of polyamide oligomers and use thereof.

There are termed as oligomers compounds in the molecules of which only a few constitutional units of the same or a different type are connected to each other repeatedly and the physical properties of which change significantly upon changing the molar mass by adding or removing one or more of the constitutional units. The end groups present likewise exert a substantial influence on the chemical and physical properties of the non-cyclic oligomers. Thus oligomers which are functionalised on the chain ends are of great importance for preparative polymer chemistry because these can serve, according to structure and functionality, as macromonomers, telechels or reactive oligomers for the production of block copolymers.

Thus compounds termed oligomers or prepolymers occur for example as intermediate steps in polymer synthesis and hence always have reactive chain ends or end groups.

Included in the oligomers are likewise cyclic and linear di-, tri-, tetramers and the higher homologues thereof which are formed necessarily in the polycondensation equilibrium during production of the polyamides 6 and 66.

In addition, oligomeric compounds are also however produced specifically, special constitutional units being jointly used so that these oligomeric compounds can take over the most varied of tasks.

Such special tasks can for example be good wetting and adhesion relative to surfaces, cross-linking reactions in plastic or adhesive formulations but also specific fixing and release of active substances.

A main differentiating feature relative to monomer compounds is thereby the generally greatly reduced volatility with however still good diffusion activity, which differentiates oligomers for many applications advantageously from the monomer compounds.

Oligomeric compounds which are used in thermoplastic materials can therefore be subdivided for example into:

a) Reactive oligomers which take over special tasks for example as intermediate steps during formulation of thermoplastic materials, such as e.g. wetting of fillers and reinforcing materials or surfaces to be coated and which are used thereby alone or already in combination with polymeric material components and such materials being able to react subsequently, e.g. under the influence of heat and often also vacuum and also the influence of radiation being able to effect a viscosity degradation or cross-linkage. Examples of condensation-active oligomers are described e.g. in EP 0 261 020 B1.

b) A highly reactive oligomer species is described in EP 0 272 695 B2. The high proportion of acetamide end groups promotes the transamidation reaction because of the good leaving group so greatly that high-molecular weight polyamide, to which this oligomer was added, is decomposed in an extrusion passage into a low-molecular weight, highly flowable melt with an average molar mass below 8000 g/mol.

c) Oligomers which—identically to many polymer formulations—were specifically restricted in their molecular weight and have for example thereby respectively the end group carboxyl, i.e.—COOH, or amino, i.e.—$NH_2$, in the case of polyamide oligomers. Such oligomers are adjusted specifically in molecular weight via the normal chain length control during their production but, during introduction into a thermoplastic formulation which is suitable for this purpose, are still condensation-active because of their functional chain ends.

d) In addition, there are polyamide oligomers, the chain ends of which contain a radical R which can no longer enter into a condensation reaction and which is for example an aromatic ring system, which can include also heteroatoms, or in particular is an alkyl radical with e.g. 1-44 C-atoms, and the latter can also be branched and can jointly contain heteroatoms, such as e.g. oxygen bridges.

The use of normal, viscosity-stable polyamide oligomers is described for example in WO 02/083345 A1, U.S. Pat. No. 5,744,433 and U.S. Pat. No. 5,154,881, polyamide oligomers of different structural construction and with non-reactive chain ends in a fine particle form and in a weight proportion of e.g. 0.2 to 10% by weight metal powder mixtures being added and thereafter high densities being able to be achieved in the "warm compaction process" under high pressure and heat effect. In these applications, the presence of a significant proportion of COOH end groups does not have a negative effect. In fact, as described e.g. in WO 2002/083346 A1, also free acid is specifically added.

It is hence the object of the present invention to make available polyamide oligomers which are constructed specifically such that their proportion of residual reactive end groups is small so that, as a result when using polyamide oligomers of this type in polyamide compositions, the properties of the polyamides can be specifically influenced.

The object is achieved by the characterising features of polyamide oligomers disclosed herein along with advantageous developments and uses of the polyamide oligomers.

The present invention comprises special polyamide oligomers with a molar mass in the range of 800 to 5000 g/mol, which are strictly controlled in their molar mass and hence are stable in the melt over a long period of time and which, as a special measure according to the invention, are characterised in that their concentration of still free COOH groups is low and the proportion of $NH_2$ functionality present—the concentration thereof expressed in mmol/kg—is always greater than the residual proportion of COOH groups. The polyamide oligomers according to the invention have therefore, in addition to essentially non-reactive end groups, a defined concentration of $NH_2$ end groups. According to the invention, the concentration of $NH_2$ end groups is max. 300 mmol/kg, preferably less than 100 mmol/kg, as a function of the molecular weight of the oligomer. It is thereby essential that the sum of the $NH_2$ and $CO_2H$ end groups is constantly always less than the concentration of all the end groups present. Determination of the concentration of the end groups is known in the state of the art. The amino and carboxyl end group concentrations are determined by means of a potentiometric titration. For the amino end groups, 0.2 to 1.0 g polyamide or polyamide oligomer are dissolved for this purpose in a mixture of 50 ml m-cresol and 25 ml isopropanol at 50 to 90° C. and, after addition of amino caproic acid, are titrated with a 0.05 molar perchloric acid solution. In order to determine the COOH end groups, 0.2 to 1.0 g of the sample to be determined are dissolved according to solubility in benzyl alcohol or in a mixture of o-cresol and benzyl alcohol at 50-100° C. and, after addition of benzoic acid, are titrated with a 0.1 M tetra-n-butylammonium hydroxide solution.

The total concentration of end groups for any polyamide oligomer is produced as a function of the number average molar mass according to equation 1. The value f indicates the average number of chain ends in the oligomer so that f adopts the value f=2 for a linear polyamide oligomer and the value f>2 for branched oligomers. The total end group concentration is composed according to equation 2.

$$C_{total} = \frac{f * 10^6}{M_n} \quad \text{(Eq. 1)}$$

$$C_{total} = C_{NH_2} + C_{COOH} + C_R \quad \text{(Eq. 2)}$$

$C_{total}$: Concentration of all the end groups in mmol/kg
$C_{NH2}$: Concentration of the $NH_2$ end groups in mmol/kg
$C_{COOH}$: Concentration of the carboxyl end groups in mmol/kg
$C_R$: Concentration of the remaining end groups which are essentially non-condensable in mmol/kg
f: Functionality; average number of chain ends per oligomer molecule
$M_n$: Number average molar mass in g/mol In a preferred embodiment, the difference ($C_{total}-C_R$) is less than 400, particularly preferred less than 300 or 200 mmol/kg. Hence the sum of the $NH_2$ and COOH end group concentration is however always smaller than the concentrations of all the end groups present.

Since f also increases with the increasing degree of branching, branched oligomers, relative to the total concentration of end groups, have a smaller concentration of condensable end groups, which reduces the danger of cross-linkages, e.g. in mixtures with polyamides.

In one embodiment, the polyamide oligomers have a COOH end group concentration of less than 50, preferably less than 25 and particularly preferred of less than 5 mmol/kg.

Both aminic functional groups, such as $R_3N$, $R_2NH$, $RNH_2$ and also carboxylate, i.e. the deprotonated carboxyl functionality which can be situated at the chain end or in the oligomer structure, thereby apply as basic component.

The polyamide oligomers according to the invention correspondingly still have only very few reactive end groups and are therefore practically no longer condensable with other functionalised constitutional units, such as monomers, oligomers or polymers. In contrast to the known reactive polyamide oligomers, the oligomers according to the invention, as pure substance and in suitable mixture with polyamide moulding compounds, are exceptionally stable against decomposition and are even able extensively to stop the decomposition of such moulding compounds in the melt.

The new oligomers according to the invention which are suitable for many high quality applications are constructed specifically in contrast thereto such that their proportion of residual reactive end groups is small, and it is in addition necessary according to the invention that the proportion of COOH groups is smaller than the sum of the basic functionalities.

Polyamides can be constructed from a multiplicity of monomer constitutional units so that a multiplicity of special end properties is also possible. This high variation range applies also to the polyamide oligomers according to the invention. Due to the choice and combination of the known polyamide constitutional units as educts and via specific adjustment of the molar mass, properties, such as crystallinity, melting or glass conversion point, the affinity to substrates and the moisture content, i.e. the basic character of the oligomer, can be adjusted specifically.

It is also possible to produce specifically branched oligomers in addition to the purely linear chain structure. The rules which thereby apply for polyamides, as are revealed e.g. in EP 0 345 645 B1, apply for the specification of the branching structure also in the case of polyamide oligomers, in particular if their molar mass is above 800 g/mol. Hence structurally branched polyamide oligomers are then reproducible and can be produced reproducibly without the formation of deposits in the reactor if, in addition to the structure-forming constitutional units, amino acids and/or lactams are exclusively the basic monomers.

A relevant feature of the invention of the new polyamide oligomers is hence not a special choice of constitutional units and their composition per se but that they are low in condensation-active end groups and in particular that the ratio of the $NH_2$ functionalities to the acidic end groups, remaining after the condensation reaction, is greater than 1, preferably greater than 2.

In a further preferred embodiment, the concentration of primary amino end groups is adjusted such that the ratio of amino and carboxyl end groups is at least 2. The maximum concentration of primary amino end groups ($NH_2$—) is thereby 300 mmol/kg. If furthermore further amino end groups are present, then these are secondary or tertiary amino end groups which are not particularly or not at all condensable. The substituents on the end-position secondary or tertiary amino groups are preferably alkyl, cycloalkyl or aryl radicals with more than 4 C-atoms, in particular with 4 to 44 C-atoms.

It is of particular importance that the polyamide oligomers according to the invention can have an excellent effect during thermoplastic processing of plastic materials and for example the flowability of the melts is improved, the crystallisation rate can be increased and often the mould-release behaviour is substantially improved. Decomposition effects in the sense of a hydrolytic chain cleavage are thereby practically excluded and no corrosion occurs on the processing machines, as are known from COOH-containing material.

In order that the polyamide oligomers according to the invention are stable against decomposition per se or in a mixture of high-molecular weight polyamides, the concentration of the sum of basic end groups must be at least 20, preferably at least 50 mmol/kg.

Polyamide moulding compounds, also containing the oligomers according to the invention, astonishingly then have excellent hydrolysis- and weathering stability if the oligomer which is used contains the concentration according to the invention—expressed in mmol/kg—of basic groups. Most advantageously, these are inserted in the oligomer structure if the compound used for the chain termination, apart from the condensation-active —$NH_2$ or COOH group, jointly contains a sterically hindered amino group (sec. or tert. amine), such as e.g. in the compounds of formula (I), (II) and (IV). Such special chain-terminating structural elements as educts are e.g. N-alkylated diamines, such as e.g. cocopropylene diamine or C16-22-alkylpropylene diamine (Duomeen M, by Akzo), 3-cyclo-hexylaminopropylene diamine, but in particular also triacetone diamine. The addition of correspondingly constructed polyamide oligomers to polyamide moulding compounds improves the hydrolysis- and weathering stability thereof without expensive stabilisers, such as e.g. of the so-called HALS type, requiring specially to be added.

(I)

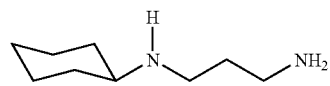

-continued

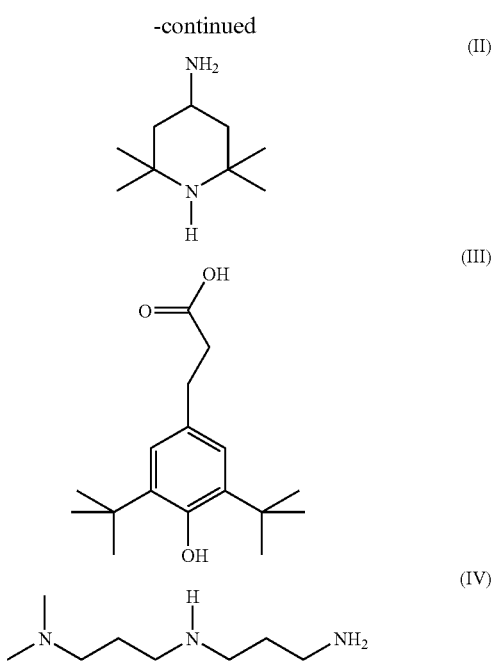

In addition, it is possible to use jointly monomer constitutional units for the oligomer production, said monomer constitutional units jointly containing a sterically hindered phenol structure in the molecule. As a result, such an oligomer improves in addition its heat stability during addition to a plastic material, in particular to a polyamide moulding compound. A corresponding monocarbylic acid, given by way of example, is 3-(3,5-di-tert.-butyl-4-hydroxyphenyl)-propionic acid (Irganox 1310 by Ciba SC), formula (III). If hence the polyamide oligomer is controlled in its molar mass following these possibilities and therefore contains the sterically hindered amine function at one chain end and the sterically hindered phenol group at the other chain end, then, with suitable addition, in particular to a polyamide moulding compound, it has the effect that the latter has at the same time excellent hydrolysis-, weathering- and heat stability.

The most varied of combination possibilities for chain length control are of course possible according to the intended effect. Thus for example only one part of the carboxylic acid can carry the sterically hindered phenol function and the remaining component can be monoalkyl, in that for example a commercial stearic acid is jointly used and only one part can be a sterically hindered amine and the remainder can be for example a commercial fatty amine with e.g. 12 to 20 C-atoms. It is ensured by means of such special combinations that the polyamide oligomer develops its stabilising effect at the same time and furthermore acts excellently as lubricant and mould-release agent.

Monomers for the production of the polyamide oligomers according to the invention are for example linear and branched-chain diamines and dicarboxlyic acids with 2 to 44 C-atoms, furthermore cyclic condensation-active diamines with an aliphatic amine function, such as e.g. 1,3- or 1,4-bisaminomethylcyclohexane or m- and p-xylylene diamine, bicyclic and thereby also repeatedly substituted diamines, such as e.g. 3,3'-dimethyl-4,4'-diaminodicyclohexylmethane or also—propane or even the so-called TCD-diamine (3(4),8 (9)-bis(aminomethyl)-tricyclo[5.2.1.0$^{26}$]decane) or diamines with the norbornane structure. Suitable dicarboxylic acids are furthermore dimerised fatty acids 1,2-, 1,3-, 1,4-cyclohexanedicarboxylic acid and also iso- and terephthalic acids and napthalene dicarboxylic acids.

The molar mass control is effected for example such that there is attached to the number of chosen monomer constitutional units with still balanced functional groups a monoamine to the one chain end and a monocarboxylic acid to the other chain end, with e.g. stearyl amine and stearic acid, respectively in the molar ratio of approx. 1:1, but with a small excess of amine so that the sum of basic chain ends has a concentration of at least 50 mmol/kg.

A further excellent possibility for the molar mass and end group control is to incorporate a bi- or multifunctional, condensation-active compound specifically into the oligomer molecule, and for each functional end group thereby created of the one type, to use a monofunctional compound of the opposite type, such as e.g. non-volatile ether diamine as constitutional unit in the oligomer structure and 2 stearic acids for the chain ends.

In the case of amino acid and/or lactam as oligomer constitutional unit, the central constitutional unit can be also tri- or even multifunctional, with e.g. trimesic acid or ethylenediaminetetrapropionic acid. For the structural termination 3 or 4 equivalents of monoamine, such as e.g. stearyl amine are then required. The process is thereby carried out such that a predetermined excess of amino function remains and compounds are jointly used specifically for special effects, which compounds jointly contain an additional sterically inhibited amine function or a sterically inhibited phenol function.

A compound class which is exceptionally suitable for the production of structure-branched oligomers are furthermore the so-called styrene maleic anhydride resins with e.g. 5 to 10 maleic anhydride groups (MA) in the molecule. The MA group thereby reacts in the melt respectively with an amine function with imide formation as growth initiator for an "oligomer arm" which is then carboxyl-terminated, the constitutional unit being amino acid or also being able to be lactam and the chain termination being effected by using a monoamine. Oligomers based on amino acid and/or lactam with this branching feature also have in addition excellent flowability with a comparatively higher molar mass and are therefore especially suitable for highly filled polyamide formulations with surfaces of excellent gloss.

The technical production of the oligomers can be effected in reaction vessels as are used to produce normal polyamides, and essentially it obeys the rules as are known for PA synthesis.

If the combination of diamine with dicarboxylic acid is the monomer which is mainly used, then the process can start from the salt thereof, or the autoclave or a preparatory so-called solutiser is fed respectively with amine and with acid in the joint presence of a suitable quantity of water, salt formation being effected and subsequently the process is carried out as is normal for PA synthesis. If lactam, in particular lactam 12, is jointly present or is the sole monomer, a so-called compression phase with the effect of water and heat is necessary in order to avoid monomer losses and to meet the stoichiometric specifications, a preparatory compression phase coordinated to the monomer system is always recommended.

The main differentiating feature relative to polyamide in the technical oligomer production is however that the melt always remains low viscous and exceptionally easily stirrable because of the specific molecular weight limitation so that the heat supply and the heat discharge are greatly facilitated and take place in an accelerated manner.

It is however essential for provision of the required oligomer stability, characterised by a low concentration of condensation-active chain ends, that the condensation reaction is continued until the required end structure is extensively formed. Such melts are then exceptionally stable, e.g. over several days.

It has been shown that special discharge methods are required in order to produce such polyamides as solid material. If the molar mass is less than 5000 g/mol, then the process can take place for example as follows:

The melt jet is fed into an intensively agitated water bath. Rapid solidification is thereby effected and the forming spherical particles can be easily filtered off.

The melt is pressed through a perforated plate into a liquid cooling medium, e.g. water, and separated from the nozzle surface by means of a rotating blade respectively so that rounded particles can be formed which are thereafter separated from the liquid. There are commercial devices for this purpose which are offered for sale for example by the company Gala in D-46509 Xanten or also by the company BKG in D-48157 Münster.

Furthermore, spraying and thereby cooling of the melt in a preferably inert atmosphere, such as e.g. nitrogen, is possible, as a result of which the melt occurs likewise directly in the form of defined particles.

The melt can likewise be discharged via a so-called pelleting belt and be cooled, pellets of a defined geometry being produced. Such devices are offered for sale for example by the company Sandvik, CH-6002 Lucerne.

Because of their comparatively low molar mass, the thereby formed coarse particles can then be ground excellently into ultrafine powder, e.g. with cooling with liquid nitrogen.

The oligomers as ultrafine powder are suitable for example as binding resins or binding systems for addition to ceramic or metal powder mixtures and effect an improvement in processing and shaping thereof according to the methods which are known for this purpose, such as e.g. powder injection moulding, warm compaction or cold compaction process.

Furthermore, they are very suitable for improving the processibility of plastic material formulations, not being volatile and not effecting chain cleavage, as is often the case when using monomer processing aids. If they are constructed suitably then they also improve the end properties of the formulations, such as for example the hydrolysis weathering- and heat stability thereof.

They are also excellently suitable as master batch carriers (MB carriers), the following possibilities being emphasised:

A) They form the MB carrier directly and exclusively, the additives being stirred into the low-viscosity melt, after which the resulting MB is discharged according to one of the described methods and thereby converted into a suitable particle form.

B) The polyamide oligomer according to the invention forms the MB carrier together with a type-related thermoplastic, e.g. with type-related polyamide.

C) Alone, in pellet form or only with a few additives necessary for the method in a small proportion, the oligomer already forms a suitable form for subsequent specific addition to thermoplastic materials in order to improve these in their application properties.

D) It is specially recommended for the provision of master batches to jointly use special acrylates which help to improve for example the distribution of the additives in the matrix. Such acrylates of greatly different molecular weight and construction are offered for sale for example under the collective term "extrusion aids" by Kaneka and by Rohm and Haas.

It is however of special interest if further processing or property-relevant additives are jointly used directly at the same time as incorporation of oligomer into the thermoplastics, in particular into a polyamide melt, such as for example additional stabilisers (heat, processing, weathering), organic colourants and pigments, tracers, biocides or also impact strength modifiers and/or flameproofing agents and respectively application-suitable combinations of such additives.

It has thereby proved to be particularly advantageous that the radicals R which end-terminate the oligomer can be specifically adapted in their properties, in particular in their wetting activity, to the requirements as MB carrier, e.g. by incorporation of oxygen bridges or a secondary or tertiary amine function and also of carboxylate groups in a small proportion and that the radical R can be linear, branched or also cyclic and also aromatic.

If an oligomer is available in which the functional end groups do not directly meet the specification that, e.g. expressed in mmol/kg, the number of basic end groups is no bigger than that of the acidic end groups —COOH, then the remaining, acidic end groups can be converted into their carboxylate form in a single process step. For example ultrafine particle basic metal salts are suitable for this purpose, such as e.g. magnesium hydroxide or calcium oxide or -hydroxide or also ultrafine particle, active zinc oxide. Also amines, in particular tertiary amines, as are often used also in the form of so-called HALS stabilisers, are suitable for the deprotonation of COOH groups still present.

In total, there is a multiplicity of organic and inorganic bases which are suitable for the deprotonation of COOH end groups. It is thereby advantageous if the inorganic salts are present in ultrafine particle form and hence with a large active surface (e.g. 10 $m^2/g$), as is the case for example with precipitated magnesium hydroxide. In the case of organic compounds, such as e.g. in the case of mono- or polyamines with preferably secondary or in particular tertiary structure, it is essential that they are diffusion-active and not very volatile.

It is not absolutely necessary that the oligomer is present in the deprotonated form already before its application. If it is applied for example in ultrafine particle powder form in the case of polyamide, for example also a suitable mixture with magnesium hydroxide is possible and the deprotonation into carboxylate is effected directly during the melting and incorporating process.

A further suitable possibility is to implement the deprotonation of residual components of COOH end groups by stirring base into the oligomer melt directly after production and before discharge from the autoclave.

It is however particularly advantageous to include the deprotonation step in the production of the master batch.

The addition of the suitable deprotonation agent can thereby be integrated directly into the chosen MB formulation and the neutralisation step is thereby effected during the MB production in the melt. If base, e.g. magnesium hydroxide, is thereby jointly used in an estimated excess, then it is likewise possible, during addition of such special master batches to polyamide formulations, also to deprotonate any carboxyl groups still present in the polyamide, which can have an additional positive effect on the processing-, hydrolysis- and weathering stability.

By using such polyamide oligomers, in particular polyamide moulding compounds, which jointly contain additional phosphorous compounds, e.g. as stabilisers against discolouration during thermoplastic shaping, such as e.g. Irgafos 168 and Irgafos 12, are significantly improved with respect to their viscosity constancy in the melt state.

The deprotonation of COOH end groups in the oligomer and thereafter the introduction of suitable additional basicity into a polyamide moulding compound therefore represents a further and preferred embodiment of the invention.

The invention is explained in more detail with reference to the subsequent FIGURE and the subsequent examples.

FIG. 1 shows a viscosity curve in the form of a diagram of a polyamide oligomer according to the invention.

EXAMPLE 1

Firstly the structural construction and the production of a typical polyamide oligomer corresponding to the invention is illustrated. The oligomer chosen for this purpose has a diamine as central constitutional unit on which 7 amino acid constitutional units are condensed as a statistical average, the rule being followed that the oligomer structure always remains amine-terminated due to the condensing-on of an amino acid constitutional unit. The chosen basic structure is consequently converted on both sides with a monocarboxylic acid such that the end groups remain extensively alkyl radicals.

There are used for this purpose:

a) as diamine, 4,7,10-trioxamidecane-1,13-diamine (TRI) with a molar mass of 220 g/mol (producer: BASF, Ludwigshafen)

b) as monocarboxylic acid, the commercially commonly used monocarboxylic acid mixture of the company FACI, Genoa, Italy with the name SS and a molecular mass of 275 g/mol and the main components stearic acid at 63% by weight and palmitic acid at 31% by weight and furthermore residual proportions of shorter and longer monocarboxylic acids c) as main structural element, between the diamine and the monocarboxylic acid, arranged statistically, the constitutional unit of polyamide 12 introduced into the formulation as lactam 12 (LC12) with a molar mass of 197 g/mol, the lactam ring being opened under the chosen and described reaction conditions and the amino acid sequence being thereby inserted into the oligomer structure according to the known reaction mechanism.

The mentioned compounds were used in the molar ratio of TRI:SS:LC12=1:2:7. In addition, a calculation correction was taken into account in such a manner that at least 20 mmol/kg of the amine function ($NH_2$ groups) remain in the excess. Hence the PA oligomer has a number average molar mass of approx. 2200 g/mol.

For the oligomer production on a semi-industrial scale, a 130 liter reaction vessel was used which was supplied with 45 kg of the raw materials in the described molar ratio. In addition, water was added for the known ring opening of the lactam which takes place during the compression phase and also 0.02% by weight of phosphorous acid in order to accelerate this reaction. The content of the autoclave was made inert, then heated and the compression phase was introduced with agitation of the formed melt, said compression phase being maintained for 5 h and 20 bar pressure at 293° C. Thereafter, the pressure was lowered, nitrogen was passed over it and, with agitation, it was cooled within 5 h slowly to 220° C. The desired oligomer structure being formed in the melt. The mobile melt was then discharged into a water-filled vessel as a thin jet with intensive agitation, the oligomer solidifying rapidly in the form of droplets and then being separated from water by filtration. Subsequently it was dried in a vacuum at 60° C. to a water content of below 0.2% by weight.

The thereby resulting oligomer powder has the following characteristic values:

a melting point as maximum of the DSC melting curve of 160° C.

a density at room temperature of 1.0 g/cm³ an equilibrium water content at RT and 100% relative humidity of 0.78% by weight and a residual content of functional end groups, as follows: $NH_2$ 50 mmol/kg, COOH 20 mmol/kg.

In order to examine the stability of the oligomer in the melt state, it was melted under inert gas at 180° C., retained in the melt state and melt samples were removed and assessed according to the following Table and also their functional end groups were checked titrimetrically. The behaviour is summarised in Table 1.

TABLE 1

| Melting time in days | Colour of the melt | Melting point in [° C.] (DSC) | End groups $NH_2$ [mmol/kg] | End groups COOH [mmol/kg] |
|---|---|---|---|---|
| 0 | Slightly yellowish | 160.5 | 50 | 20 |
| 1 | Slightly yellowish | 160.8 | 32 | <5 |
| 2 | Slightly yellowish | 160.9 | 29 | <5 |
| 6 | Slightly yellowish | 160.2 | 29 | <5 |
| 15 | Slightly yellowish | 160.6 | 29 | <5 |

The melt thereby remained mobile without change over the whole period of time and hardly discoloured. A test for a kinematic viscosity measurement showed that the oligomer is so low viscous already just above the melting point, e.g. at 170° C., that no sheer profile-dependent measurement was possible. Just above the oligomer melting point at 161° C., the viscosity curve according to FIG. 1 was produced.

EXAMPLES 2 TO 27

In order to represent the large variation range in which viscosity-stable polyamide oligomers according to our invention can be produced, the corresponding formulations were made to react on a 35 g scale under inert gas in a condensation tube made of glass and the procedure was thereby carried out according to the following general specification.

The basic constitutional units and the chosen control system respectively were mixed in a molar ratio according to the charts and transferred into the reaction tube with a small additional quantity of water and subsequently the temperature of the resulting melt was increased slowly and in steps, adapted to the respective formulation. A specifically added small quantity of water thereby facilitates the salt formation firstly. During heating, firstly the excess water now evaporates and, from approx. 180° C., the condensation reaction into amide is begun with water cleavage. The temperature, adapted respectively to the melting point of the respective oligomer, is now increased in steps and, after exceeding the oligomer melting point, is maintained until the oligomer formation has essentially ceased. The end temperature of the heating block surrounding the condensation tubes, which temperature is kept at a minimum, was 250° C.

Oligomers based on so-called "long-chain" monomer systems, such as 11, 12, 610 or 612, are of particular interest for many cases. The structural control with use of long-chain monocarboxylic acids and monoamines is exceptionally suitable here and the ether diamine TRI was jointly used in many cases as non-volatile diamine.

If "short-chain" monomers with a low C-number, such as 6, 66, 6I, 6T or MXD 6, are chosen as basic constitutional units, then e.g. benzoic acid and e.g. also lauric acid should be used advantageously as chain-terminating acid.

The diamine TRI with its ether groups which increase the polarity must not be exchanged.

In charts 2 and 3, the titles of the monomers and controllers used are listed.

TABLE 2

| Abbreviation | Title |
| --- | --- |
| 12 | Aminolauric acid |
| 11 | Aminoundecanoic acid |
| 610 | The salt from diaminohexane with sebacic acid |
| 612 | The salt from diaminohexane with dodecanedicarboxylic acid |
| 6 | Aminocaproic acid |
| 66 | The salt from diaminohexane with adipinic acid (AH salt) |
| TPS | Terephthalic acid |
| IPS | Isophthalic acid |
| 6I | The salt from diaminohexane with isophthalic acid |
| 6T | The salt from diaminohexane with terephthalic acid |
| MXD6 | The salt from m-xylene diamine with adipinic acid |
| LC6 | Caprolactam |
| LC12 | Laurinlactam |
| HMD | Diaminohexane |

TABLE 3

| Abbreviation | Molar mass [g/mol] | Functionality | Title |
| --- | --- | --- | --- |
| TRI | 220 | 2 | 4,7,10-trioxatridecane-1,13-diamine |
| SS | 275 | 1 | Stearic acid, commercial |
| C10 | 202 | 2 | Sebacic acid |
| ARM | 263 | 1 | Armeen HT, monoamine mixture by Akzo |
| BZ | 122 | 1 | Benzoic acid |
| JT403 | 480 | 3 | Jeffamin T403, triamine by Huntman company |
| AOA | 173 | 3 | 4-aminomethyl-1,8-octane diamine |
| ICOR | 468 | 3 | Irgacor L190, a tricarboxylic acid from Ciba SC |
| LS | 200 | 1 | Lauric acid |
| MOX | 278 | 1 | 3-(3,5-di-tert-butyl-4-hydroxyphenyl)-propionic acid |
| TAC | 156 | 1 | Triacetone diamine |
| L252 | 156 | 1 | 3-(cyclohexylamino)-propylamine |

If special constitutional units are jointly used which likewise control the molar mass, such as are represented in formula I to IV for the claims and which effect special properties in the oligomer during use thereof, then long-chain monomer constitutional units, such as e.g. 11, 12, 610 or 612, can be used advantageously.

It is the functionality which is necessary respectively for a normal condensation reaction which is mentioned.

The laboratory tests which were implemented are summarised below in Table 4 and described subsequently more precisely.

EXAMPLES 2 TO 5

This concerns oligomer formulations with aminolauric acid, the condensation-active constitutional unit for polyamide 12 and the same type of structural control as in example 1, the number of monomer constitutional units being however increased in steps. The melting behaviour, compared via DSC measurements, shows:

The melting point increases with increasing number n of basic constitutional units and finally reaches the normal melting point of polyamide 12 with an n of 40.

If the number of constitutional units is low, e.g. 4, then a plurality of additional melting peaks appears because, in the associated, still low molar mass range, the oligomer structures forming one next to the other differ significantly from each other. From a number n>7, this effect becomes negligible.

EXAMPLES 6, 7 AND 8

The basic constitutional unit here is aminolauric acid but different control systems are used. A bifunctionally acting controller (example 6: C10, example 8: TRI) is incorporated into the oligomer structure in example 6 and 8 and in addition the consequently resulting reactive end groups are stearate-terminated, completely in example 6 and, in example 8, only slightly more than half.

As a result, the basicity in example 8 is specifically increased and, with the common end group determination, the expected 280 mmol/kg of amine function are found. The melting point for example 6 and 8 respectively is almost congruent at 168° C. In example 7, the structural controllers are combined such that the oligomer chain is not disturbed by means of which the oligomer can crystallise better. This has the effect also of a higher melting point.

EXAMPLES 9 TO 11

In these examples, whilst maintaining the structural controller system as we used it already in examples 1 to 5, the basic constitutional unit respectively was chosen differently. In the DSC, melting points which are respectively somewhat lower according to expectation than in the case of the polyamide associated with the constitutional unit are produced.

EXAMPLES 12 TO 16

These examples now comprise very different constitutional units but respectively with a low C number of 6 to 8 and, adapted thereto, with the controller system TRI/BZ. This control now adapted to the constitutional units proved to be very system-compatible. As the melting behaviour shows in the DSC, these oligomers differ significantly in their properties. Thus for instance the oligomer in example 14 softens amorphously with a glass conversion point of approx. 55° C., whilst the oligomers 15 and 16 respectively display a significant glass transition step and thereafter a broad melt region follows.

EXAMPLES 17 TO 19

These examples are based on the same basic constitutional units as already in examples 12 to 16 but, for structural control, this comparison to SS combines shorter-chain lauric acid LS together with TRI. This controller system is likewise compatible with the short-chain basic monomers. The chain ends of these oligomers again have an alkyl radical, here with 11 C-atoms and the weight proportion of which in the oligomer exceeds 20%. These thus different structures in comparison to examples 12 to 16 already influence the oligomer properties significantly. In particular, the DSC measurement shows better-formed melting bands, probably because the chain movement is increased thanks to the presence of the linear alkyl radical at the chain ends.

EXAMPLES 20 TO 23

These examples include the production of once and repeatedly branched oligomer structures, respectively with alkyl chain ends, stemming from SS, the production of which proved to be possible because an amino acid was used exclusively as basic constitutional unit. Due to the thereby increased number of flow-active chain ends, e.g. the flowability of highly filled polyamide moulding compounds can be significantly improved, which finally leads to injection moulded parts with improved surface quality. As a result of the special choice of the molar ratio of the components of the controller system, oligomers are produced respectively which are significantly basic, which, during use thereof as processing aids in polyamide moulding compounds, increases the hydrolysis- and weathering stability thereof. Formulations 22 and 23, where Irgacor L 190 (ICOR) is the central controller constitutional unit, are thereby of particular interest because this molecule contains in addition 3 sterically inhibited amine functions, which very significantly increases the basicity without reamidation effects being possible.

EXAMPLES 24 TO 27

These examples comprise oligomers according to the invention which have especially high usage value, said oligomers being produced exclusively with combinations of monofunctionally acting acids and amines and the control being effected equivalently, the molar ratio of acid to base being 1:1. A special carboxylic acid and special amine respectively are thereby jointly used, which contain jointly structural elements which have a significantly stabilising effect on polyamide moulding compounds. In the case of the acid MOX, it is the sterically hindered phenol group which increases the heat stability in polyamide moulding compounds, in the case of the amine TAC, it is the sterically hindered amine structure (HALS) which is well known in technology for effective weathering stabilisation. TAC has an additional effect as acid collector so that when using such oligomers the hydrolysis stability can also be improved.

These oligomers according to the invention hence contain in common alkyl groups for high flowability and good mould-release behaviour, sterically hindered phenol groups for improvement in heat stability and in particular sterically hindered amine structures for improved weathering- and hydrolysis stability. Due to this special structural construction, it is achieved that the advantageous basicity is present respectively in a high proportion and without decomposition effects occurring during use.

COMPARATIVE EXAMPLE 28 AND EXAMPLES 29, 30 AND 31

In these examples, the behaviour of PA-12 melts is compared, said melts containing a PA12 oligomer of the basic structure, as described in example 1.

The examples are summarised in the subsequent Table 5 and the polyamides and additives which are used are as follows:
a) High-viscosity PA-12, produced without using a chain controller with end groups: COOH, 30 mmol/kg; $NH_2$ 23 mmol/kg
b) High-viscosity PA-12, adjusted to a slight excess of amino end groups: COOH, 20 mmol/kg; $NH_2$ 50 mmol/kg
c) PA-12 oligomer according to the invention with COOH less than 5 mmol/kg and $NH_2$ of 69 mmol/kg
d) Normal PA-12 oligomer with COOH of 50 mmol/kg and $NH_2$ of 20 mmol/kg All the formulations were heat-stabilised with respectively 0.3% by weight Irganox 245 and 0.2% by weight Irgafos 168 (stabilisers by Ciba SC, Basel). The mixtures were compounded on a laboratory extruder, Teachline, of the company Collin with a material temperature of 250° C. and a rotational speed of 150 rpm and a throughput of respectively 3 kg/h and the granulates were subsequently adjusted to a water content of 0.18% by weight. Thereafter, the relative solution viscosity was then determined according to the normal specification on a 0.5% solution in m-cresol.

Subsequently, the granulates were used for a MVR measurement at 275° C. and a load of 5 kg and respectively the MVR value was thereby determined after a melting time of 4 and 20 minutes. The relative viscosity was likewise measured on the associated melting cone in order to characterise the polymer decomposition with thermal loading.

The results are as follows:

In the comparative example 28 in which the oligomer is used with a residual proportion of carboxyl end groups of 50 mmol/kg, a considerable decomposition of the high-molecular weight PA12 was effected, which is expressed in the dramatic increase in MVR value and in the significant reduction in values for the relative viscosity. In contrast, the decomposition in examples 29 to 31 in which polyamide oligomer with the excess of amino groups according to the invention is used is only small even after a melting time of 20 min. The MVR and the relative viscosity change only very little despite the high moisture content. From the moulding compounds of examples 29, 30, 31 and the comparative example 28, tensile impact strength bars were produced by injection moulding and subsequently a hydrolysis test was implemented in water at 130° C. On the tensile impact bars from the comparative example 28, a significant hydrolytic decomposition was established. After storage of 672 h (corresponding to 28 days), the tensile impact strength was still only 88 $kJ/m^2$; this corresponds to only 13% of the starting value. In contrast, the sample bodies from examples 29 to 31 displayed a significantly smaller hydrolytic decomposition after the same length of storage duration at 130° C. in water (Table 5).

The formulations according to the invention thereby differ as follows: In example 29, PA12 oligomer according to the invention together with a small proportion by weight of magnesium hydroxide is added to normal polyamide 12, in example 30 polyamide 12 and oligomer is used which has an amino end group excess and, in example 31, this formulation contains in addition some magnesium hydroxide.

The results of these examples prove impressively that with co-use of polyamide oligomer according to the invention in suitable polyamide formulations, processable moulding compounds of increased usage value result without decomposition.

TABLE 5

| Example | 28 | 29 | 30 | 31 |
|---|---|---|---|---|
| Composition (% by wt.) | | | | |
| PA12 high-viscosity slight excess of —COOH | 97 | 97 | | |
| PA12 high-viscosity slight excess of —$NH_2$ | | | 97 | 97 |
| PA12 oligomer, according to the invention | | 3 | 3 | 3 |

TABLE 5-continued

| Example | 28 | 29 | 30 | 31 |
|---|---|---|---|---|
| PA12 oligomer slight excess of —COOH | 3 | | | |
| Magnesium hydroxide, specific surface 10 m²/g a) | | 0.3 | | 0.3 |
| Analysis | | | | |
| Relative viscosity (0.5% in m-cresol) | 2.15 (100%) | 2.20 (100%) | 2.24 (100%) | 2.23 (100%) |
| MVR, 275°/5 kg load after 4 min., [ml/10 min] | 36 | 21 | 40 | 51 |
| MVR, 275°/5 kg load after 20 min., [ml/10 min] | 198 | 30 | 51 | 42 |
| Relative viscosity in the melting cone, 4 min. | 2.08 (97%) | 2.14 (97%) | 2.22 (99%) | 2.23 (100%) |
| Relative viscosity in the melting cone, 20 min. | 1.80 (83%) | 2.09 (95%) | 2.15 (96%) | 2.18 (98%) |
| Change in relative viscosity | 0.28 | 0.05 | 0.07 | 0.05 |
| Hydrolysis storage at 130° C. | | | | |
| Tensile impact strength [kJ/m²] after 0 h hydrolysis storage at 130° C. | 696 (100%) | 684 (100%) | 734 (100%) | 645 (100%) |
| Tensile impact strength [kJ/m²] after 96 h hydrolysis storage at 130° C. | 422 (61%) | 490 (72%) | 625 (85%) | 645 (100%) |
| Tensile impact strength [kJ/m²] after 672 h hydrolysis storage at 130° C. | 88 (13%) | 205 (30%) | 448 (61%) | 397 (62%) | a) data relative to 100% compound

EXAMPLES 32, 33 AND 34

Production on a semi-industrial scale as example 1.

Ratios

TABLE 6

| Examples | 32 | 33 | 34 |
|---|---|---|---|
| Composition (% by wt.) | | | |
| LC6 | 63.65 | | |
| AH salt | | 63.65 | |
| LC12 | | | 66.92 |
| SS | 24.00 | 24.00 | 25.24 |
| TRI | 10.14 | 10.14 | |
| HMD | | | 5.62 |
| H₃PO₃ | 0.02 | 0.02 | 0.02 |
| Anti-foaming | 0.02 | 0.02 | 0.02 |
| H₂O | 2.18 | 2.18 | 2.18 |
| Analysis | | | |
| [COOH] [mmol/kg] | 24 | 28 | 14 |
| [NH₂] [mmol/kg] | 53 | 87 | 32 |

The invention claimed is:

1. A polyamide oligomer with linear or branched chain structure with a number average molar mass of 800 to 5000 g/mol, with end groups which are formed partially by basic end groups which are at least partially NH₂ end groups, and CO₂H end groups, produced by condensation of polyamide-forming monomers and an additional monofunctionally acting structural element, the polyamide-forming monomer including at least one of diamine and dicarboxylic acid or amino acid or lactam, and the additional monofunctionally acting structural element comprising at least one of amine or carboxylic acids, wherein 60 to 80% of the end groups are formed by the additional monofunctionally acting structural element, wherein the concentration of NH₂ end groups is at most 300 mmol/kg and the NH₂ end groups are present in excess in a ratio to the CO₂H end groups, with the proviso that the sum of the NH₂ and CO₂H end group concentration is smaller than the concentration of all end groups, and the condensation of polyamide-forming monomers and additional monofunctionally acting structural element avoids acetamide end groups.

2. The polyamide oligomer according to claim 1, wherein the concentration of the NH₂ end groups is at most 100 mmol/kg.

3. The polyamide oligomer according to claim 1, wherein the concentration of basic end groups is at least 20 mmol/kg.

4. The polyamide oligomer according to claim 3, wherein the concentration of basic end groups is at least 50 mmol/kg.

5. The polyamide oligomer according to claim 1, wherein the ratio of NH₂ end groups to the carboxyl end groups is at least 2:1.

6. The polyamide oligomer according to claim 1, wherein the basic end groups are selected from primary amino end groups, secondary amino end groups, tertiary amino end groups or carboxylate.

7. The polyamide oligomer according to claim 1, wherein the additional monofunctionally acting structural element is at least one of a hindered amine or a sterically hindered phenol.

8. The polyamide oligomer according to claim 7, wherein structural elements of the polyamide oligomer are defined by at least one of formula I to IV

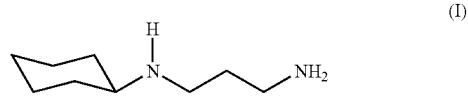
(I)

(II)

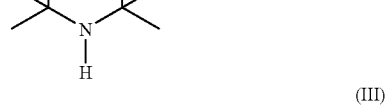
(III)

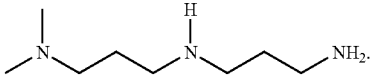
(IV)

9. The polyamide oligomer according to claim 1, wherein free carboxyl groups which are possibly present were deprotonated into carboxylate groups before or during application of the oligomer with a base.

10. The polyamide oligomer according to claim 9, wherein an alkali or an alkaline earth hydroxide, was used as base.

11. The polyamide oligomer according to claim 1, which is in a form of a master batch carrier.

12. A master batch comprising the polyamide oligomer according to claim 1.

13. The master batch according to claim 12, wherein the master batch contains additives stirred into a low-viscosity melt.

14. The master batch according to claim 12, wherein the master batch contains at least one of basically acting compounds, stabilisers, processing aids, colourants and pigments, or antibacterial additives.

15. A plastic material moulding compound including the polyamide oligomer according to claim 1.

16. The plastic material moulding compound according to claim 15, wherein the polyamide oligomer serves as at least one of flow improver, stabiliser for hydrolysis, heat and UV or processing agent.

17. The polyamide oligomer according to claim 1, in the form of a powder.

18. A binder system or binding resin for at least one of ceramics or metals in powder injection moulding including the powder according to claim 17.

19. The polyamide oligomer according to claim 17, wherein the powder is an ultrafine powder.

20. The polyamide oligomer according to claim 10, wherein the alkali or an alkaline earth hydroxide comprises magnesium hydroxide.

21. A master batch comprising the polyamide oligomer according to claim 11, and a further thermoplastic.

22. The master batch according to claim 21, wherein the further thermoplastic comprises a polyamide.

23. The polyamide oligomer according to claim 1, wherein the additional monofunctionally acting structural element comprises stearic acid.

* * * * *